3,236,640
PROCESS FOR THE PREPARATION OF PRINTING PLATES USING PARTICULARLY A PHOTOCONDUCTIVE MULTILAYER STRUCTURE
Martha Tomanek and Fritz Uhlig, Wiesbaden-Biebrich, Germany, assignors, by mesne assignments, to Azoplate Corporation, Murray Hill, N.J.
No Drawing. Filed Dec. 21, 1960, Ser. No. 77,283
Claims priority, application Germany, Dec. 29, 1959, K 39,549
12 Claims. (Cl. 96—1)

As is known, copies are produced by electrophotographic means as follows: an electrophotographic material is electrically charged; exposed beneath a master to light, or an episcopic image is projected thereon; the electrostatic image thereby produced is developed by dusting over with a resin powder and then fixed, e.g., by heating, so that the resin powder is irremovably anchored to the support. The electrophotographic material used for this purpose consists of a support with a reproduction coating consisting of or containing a photoconductive material.

From electrocopies of this type, printing plates have been prepared by treatment with a solvent. The coating is removed by the solvent from the image-free parts and the parts thus bared are—where necessary—made water-conductive by suitable treatment and the image parts are inked up with greasy ink so that they are suitable, as a printing plate, for the production of prints. This known process has the disadvantage that the image-bearing parts also are, to some considerable extent, removed by the solvent so that inferior printing plates are sometimes obtained.

A process for the preparation of printing plates, in particular for planographic printing, from images obtained electrophotographically by means of photosemiconductor coatings has now been found in which a coating of an alkali-soluble resin is applied to an electrophotographic support and the resin coating is then covered with an organic photosemiconductor coating, images then being produced electrophotographically in known manner, after which the organic photosemiconductor coating and the layer consisting of alkali-soluble resin are removed in the image-free parts by means of alkaline liquid which may contain water and/or organic solvents.

The insulating precoat consists of resin having groups conferring alkali-solubility. Exemplary of such groups are: acid anhydride groups, carboxylic acid groups, sulfonic acid groups, sulfonamide or sulfonimide groups. The compounds with groups conferring alkali-solubility may, for example, be: vinyl polymers or interpolymers, e.g., polystyrene-sulfonic acid; interpolymers of styrene and maleic anhydride or resins having acid groups, e.g., phthalic acid ester resins, maleinate resins, alkyd resins and colophony resins. Also, highly polymeric polyacrylic acid can be used. These compounds can also be used both in the form of mixtures with each other and with small quantities of other resins or other materials such as sensitizers, pigments and fillers.

The interpolymers of styrene with maleic anhydride, in varying proportions, are compounds which have proved particularly suitable for the process in question. Of these, those containing one mole of styrene to about one mole of maleic anhydride are particularly advantageous. These resins adhere particularly well to metals.

As photoconductive coatings for the present process, organic photoconductive compounds such as the following are suitable: oxadiazoles, e.g., 2,5-bis-(4'-diethylaminophenyl-(1'))-1,3,4-oxadiazole, 2,5-bis(4'-(n-propylamino)-2'-chlor-phenyl-(1'))-1,3,4-oxadiazole or 2,5-bis-(4'-N-ethyl-N-n-propylamino-phenyl-(1'))-1,3,4-oxadiazole; imidazolones, e.g., 4,5-bis-(4'-aminophenyl)-imidazolone-(2); imidazole-thiones, e.g., 4,5-diphenyl-imidazolthione-(2); triazoles, e.g., 1-methyl-2,5-bis-(4'-diethylaminophenyl-(1'))-1,3,4-triazole; imidazoles, e.g., 2-(4'-dimethylaminophenyl)-6-methoxy-benzimidazole; oxazoles, e.g., 2-(4'-chlorphenyl)-phenanthreno-(9',10':4,5)-oxazole; thiazoles, e.g., 2-(4'-diethylaminophenyl)-6-methoxy-benzthiazole, thiophenes, e.g., 2,3,5-triphenyl-thiophene; triazines, e.g., 3-(4'-aminophenyl)-5,6-di-pyridyl-(2")-1,2,4-triazine or 3-(4'-dimethylaminophenyl)-5,6-di-(4"-phenoxyphenyl)-1,2,4-triazine; hydrazones, e.g., 4-dimethylamino-benzaldehyde-isonicotinic acid hydrazone or anthracene-9-aldehydephenyl acetic acid hydrazone; styryl compounds, e.g., 2-(4-dimethylamino-styryl)-6-methyl-pyridone or 2-(4'-dimethylamino-styryl)-5- (or 6-)aminobenzimidazole; azomethines, e.g., 4-dimethylaminobenzylidene-$\beta$-naphthylamine; amino compounds, e.g., 3-amino-N-ethyl-carbazole, 3-dimethylamino-1,2-benzophenazine; anthracene and its derivatives, e.g., anthracene-1-sulfanilide. 2,5-bis-(4'-diethylaminophenyl-(1')) - 1,3,4-oxadiazole, 2,5-bis-(4'-diethylaminophenyl-(1'))-1,3,4-triazole and 2-(4-dimethylaminostyryl)-6-methyl-pyridone are compounds that have proved particularly suitable.

Also, mixtures of the foregoing photosemiconductors can be used.

The base materials used as supports may be any that satisfy the requirements of electrophotography, e.g. metal or glass plates, paper or plates or foils made of electroconductive resins or plastics, such as polyvinyl alcohol, polyamides, and polyurethanes. Other plastics which have the required electroconductivity, such as cellulose acetate and cellulose butyrate, especially in a partially saponified form, polyesters, polycarbonates, and polyolefines, if they are covered with an electroconductive layer or if they are converted into electroconductive materials, e.g. by chemical treatment with or by introduction of materials which render them electrically conductive, may also be used. Generally speaking, electroconductive supports are suitable for the purposes of the present invention. In the sense of the present invention, the term "electroconductive support" comprises materials having a specific conductivity higher than $10^{-12}$ ohm$^{-1}$ cm$^{-1}$, preferably higher than $10^{-10}$ ohm$^{-1}$ cm$^{-1}$.

For coating purposes, the compounds of high molecular weight with groups conferring alkali-solubility are dissolved in a suitable solvent and then applied to the supporting materials. This can be done in known manner by spraying, painting, roller application, immersion or by application of the solution to the support while rotating. The material is then dried, preferably at elevated temperature.

After the alkali-soluble insulating layer has been dried, the photoconductive organic compound, or the mixture of a number of organic photoconductive compounds, is applied in a suitable solvent solution such as will not dissolve the insulating layer.

To increase the sensitivity of the reproduction coatings in the visible region of the spectrum, sensitizers can be added in small quantities, i.e., about 0.0001 to about 0.5 percent with respect to the solid substance, both to the solutions containing the insulating resin and to the solutions of the photosemiconductor. These sensitizers which generally are dyestuffs, are described, for example, in Belgian Patent 558,078.

The preparation of the electrocopies is in a manner known per se. The electrocopying material described above is charged in a charging device by a corona discharge and then the charged electrocopying material is exposed to light under a master by the contact process. Alternatively an episcopic or diascopic image of the master can be projected on the material or the material can be exposed directly in a camera. The latent electrostatic image is then developed with an electrophotographic developer. Such developers consist of mixtures composed of fairly coarse particles, known as the carrier, e.g., glass balls, and fine resin powders, known as the toner. Also, mixtures consisting of two toners can be used, or again one toner suspended in a non-conductive liquid. If a developer consisting of two toners is used, the toner having a charge of opposite polarity to that of the electrostatic image about to be developed, to which it is therefore attracted, must be insoluble in alkali, while the oppositely charged toner must dissolve when treated with aqueous alkaline liquids. After the development, which is in known manner, the image which becomes visible is fixed, e.g., by heating with an infra-red radiator to about 100–170° C., preferably 120–150° C., or by treatment with solvents or steam and, in this way, images resistant to abrasion and corresponding to the master are obtained. For conversion of the electrophotographic images of the invention into printing plates, these electrocopies are treated with an alkaline liquid, so that both the original photoconductive coating and the insulating resin layer are removed from the image-free parts and the support is bared.

The image-free parts may be treated with an acid, such as phosphoric acid, to improve the hydrophilic properties thereof. The treatment for conversion to printing plates may be a simple wiping-down process, e.g., with a wetted cotton pad, by immersion in the developer bath, or by the use of mechanical devices to apply the alkaline liquid e.g., rollers.

For the removal of the coatings in the image-free parts, solutions of inorganic and/or organic alkaline materials in water and/or in organic solvents are used. The inorganic alkaline materials used may be ammonia, alkali metal and alkaline earth metal hydroxides, preferably ammonium hydroxide, sodium hydroxide and potassium hydroxide (calcium hydroxide, barium hydroxide and strontium hydroxide have also given good results) and alkali phosphates, in particular the sodium phosphates having an alkaline reaction in aqueous solution, and alkali polyphosphates such as sodium polyphosphate. The organic basic material may be primary, secondary and tertiary lower saturated amines, e.g., trimethylamine, ethylamine, diethylamine, triethylamine, propylamine, butylamine, isobutylamine, dibutylamine, tributylamine, diisobutylamine, octylamine and dioctylamine; piperidine, N-methyl-piperidine, N-ethyl-piperidine and morpholine; amino alcohols such as ethanolamine, diethanolamine, triethanolamine, N-methyldiethanolamine and N-ethyldiethanolamine, diamines and polyamines such as ethylene diamine, diethylene triamine and triethylene-tetramine and also lower substituted acid amides such as dimethyl formamide. The low-volatility amines or amino alcohols, in particular ethanolamine, diethanolamine and octylamine, or mixtures thereof, are preferably used.

Some of these basic materials can be used undiluted. Generally, however, it is best, particularly in the case of the stronger bases, to use them in diluted form. Preferably, solutions of 0.01–15 percent, particularly 1–5 percent, are used. The solvent used may be water and/or organic solvents; a wide variety of the latter may be employed. However, those preferred contain oxygen in the molecule in the form of ether, ketone, alcohol or ester groups. The following may be mentioned as examples: aliphatic ethers such as dibutylether, ethylbutylether, diisopropylether, dioxane, and tetrahydrofuran; lower ketones such as acetone, methylethylketone, and dipropylketone; lower esters such as methylacetate, ethylacetate, butylacetate, methylpropionate, methylbutyrate, ethylbutyrate and, in particular, solvents containing alcohol groups, e.g., methanol, ethanol, propanol, isopropanol, butanol, isobutanol, ethyleneglycol, polyethyleneglycol, glycerine, ethyleneglycol monomethylether and glycerine monoethylether. The multivalent alcohols such as ethyleneglycol, glycerine, polyethyleneglycol, and also aqueous solutions of solid polyglycols of higher molecular weight may be mentioned as particularly satisfactory. Also, mixtures of several solvents may be used.

It is further often advantageous for thickening agents to be added to the alkaline liquids, to increase the viscosity thereof. Examples of useful thickening agents are polyvinyl alcohol, cellulose products such as carboxy-methyl-cellulose or alkyl-cellulose, and soluble starch products.

Further, it can be advantageous for the fixed electrostatic image, before being treated with an alkaline liquid, to be treated with a lacquer and then to be heated for a short time, about 0.25 minute to 10 minutes, preferably 0.5 to 2 minutes, to about 80–120° C. During the subsequent alkaline treatment, this lacquer topcoating then remains on the image parts while it is dissolved away with the photoconductor coating from the image-free parts. By this treatment, still greater increase in the printing run can often be achieved.

It may be an advantage for water-soluble silicates such as sodium silicate, and potassium silicate or mixed silicates such as sodium-potassium silicates, which may also contain small quantities of calcium silicate, to be added to the alkaline liquids to increase the hydrophilic properties of the image-free non-printing areas on the printing plate.

Immediately after the treatment with alkaline liquid, the printing plate is advantageously rinsed down with water. Hydrophilic properties may be increased still more by wiping over with phosphoric acid. After the plate has been inked up with greasy ink, printing can be effected in the usual way.

In comparison with photoconductive coatings hitherto known, in which the photoconductive compound is incorporated in insulating resins, those of the present invention have the advantage that the individual particles of the photosemiconductor are in direct contact with each other and the discharge thereof, under the influence of light, is accordingly favored. Thus, very thin coatings of the photosemiconductor are adequate to enable good copies to be produced by the electrophotographic process. Exposure time is therefore reduced.

The invention will be further illustrated by reference to the following specific examples:

*Example 1*

6 parts by weight of a styrene interpolymer, containing carboxyl groups, with a decomposition point of 200–240° C., and a specific weight of 1.15–1.16, and 0.01 part by weight of Rhodamine B extra (Schultz, Farbstofftabellen, 7th edition, vol. 1, 1931, No. 864) are dissolved in 100 parts by volume of ethyleneglycol monomethylether and the solution is coated upon a mechanically roughened aluminum foil. After this coating has dried, a solution containing 4 parts by weight of 2,5-bis-(4'-diethylaminophenyl-(1'))-1,3,4-triazole and 0.005 part by weight of Rhodamine B extra in 100 parts by volume of toluene is applied. After the solvent has evaporated, the material is provided with a negative electric charge, by a corona discharge, and then exposed under a master by the contact process for 0.2 second to the light of a 100-watt filament lamp at a distance of 40 cm. After exposure, a powder mixture consisting of 100 parts by weight of kieselguhr and 40 parts by weight of a pigmented, finely pulverized polystyrene powder is distributed over the invisible electrostatic image. Both powders adhere to the surface of the foil, the positively charged polystyrene powder being attracted to the negatively charged parts, not affected by the light, and the kieselguhr powder remaining on the discharged parts which were struck by the light. An image corresponding to the master thus becomes visible. It is heated for 15 seconds to about 180° C. and thus is irremovably anchored to the support. For the preparation of a printing plate, the image is wiped over with a solution consisting of 10 per cent ammonia (25 percent) and 90 percent polyglycol having an average molecular weight of 190–210 and a solidification point of −50° C. After the printing plate has been briefly rinsed down with water and inked up with greasy ink, it can be used for printing in an offset machine in the usual manner.

*Example 2*

The procedure described in Example 1 is followed, but a foil made of bright, rolled aluminum washed with trichloroethylene is coated with a solution of 8 parts by weight of a styrene interpolymer, such as is described in Example 1, in 100 parts by volume of ethyleneglycol monomethylether. After the resin layer has dried, it is coated with a solution of 3 parts by weight of 2,5-bis-(4'-diethylaminophenyl-(1'))-1,3,4-oxadiazole and 0.1 part by weight of Bengal Rose (Schultz, No. 889) in a solvent mixture consisting of 100 parts by volume of toluene and 5 parts by volume of methanol. After the evaporation of the solvent, the coating is provided with a positive charge by a corona discharge and then exposed, in contact with the master, for 0.3 second to a 100-watt filament lamp at a distance of 40 cm. After exposure, the coated surface is treated with the powder mixture described in Example 1. The positively charged pigmented powder settles on the parts struck by the light and the negatively charged kieselguhr particles adhere to the positively charged parts which have not been affected by the light; a reversed image of the master becomes visible. After the powder image has been heated to 150° C. for 30 seconds, it is converted into a printing plate. In this treatment the entire image surface is wiped over with a solution consisting of 8 parts by volume of octylamine, 72 parts by volume of polyglycol with an average molecular weight of 190–210 and a solidification point of about −50° C. and 20 parts by volume of methanol. After brief rinsing with water, the plate is inked up with greasy ink.

*Example 3*

A mechanically roughened aluminum foil is coated with a solution consisting of 5 parts by weight of a maleinate resin having a melting point of 108–118° C. and an acid number of 20 (Alresat 224 C.) and 0.01 part by weight of Rhodamine B extra (Schultz, No. 864) in 100 parts by volume of toluene. After this coating has dried, a coating solution consisting of 6 parts by weight of 2-(β-(4-dimethylaminostyryl))-6-methyl-4-pyridone and 0.05 part by weight of Crystal Violet (Schultz, No. 785) in 100 parts by volume of ethyleneglycol monomethylether is applied and the solvent is then removed. The electrocopying material thus prepared is negatively charged by a corona discharge and a leica diapositive with an illumination strength of 3 lux is projected on the charged electrocopying material for one minute in a photographic enlarging apparatus. The image is then developed with a developer consisting of a toner and iron powder, and is fixed by heating to 100–150° C.

For conversion into a printing plate, the image is wiped over with a solution containing 30 percent methanol, 20 percent glycerine, 45 percent glycol and 5 percent sodium metasilicate, and is then inked up with greasy ink.

*Example 4*

The procedure described in Example 1 is followed but, for the resin precoat, a solution is used which consists of 10 parts by weight of an oil-free alkyd resin with a melting point of 60–70° C. and an acid number of 180–200 (Alftalat 420 A) and 0.3 part by weight of Astraphloxin (Shultz, No. 930) in 100 parts by volume of ethyleneglycol monomethylether. After this coating has dried, a coating solution is applied consisting of 4 parts by weight of 2-(4'-diethyl-aminophenyl)-4,5-diphenyl-imidazole and 0.1 part by weight of Astraphloxin in a solvent mixture of 90 parts by volume of toluene and 10 parts by volume of methanol, and the solvent is evaporated. The electrocopying material thus prepared is negatively charged with a corona discharge and then exposed for 20–60 seconds at reproduction scale stop 9 in the cassette of a document camera fitted with a reversal prism. The light source used consists of four 30-amp carbon arc lamps. The master used is a printed page with printnig on the back.

The electrostatic image thus obtained is developed by dusting over with a resin powder as described in Example 1, whereupon the non-reversed image becomes visible and is fixed by the application of heat at about 150° C.

For conversion into a printing plate, the image is wiped over with a solution consisting of 10 percent monoethanolamine, 5 percent sodium silicate and 85 percent polyglycol, having an average molecular weight of 190–210 and a solidification point of −50° C., and afterwards it is inked up with greasy ink.

*Example 5*

7 parts by weight of a processed natural resin with a melting point of 58–72° C. and an acid number of 145–155 (Erkazit-Specialharz HP) and 5 parts by weight of an oil-free alkyd resin with a melting point of 77–93° C. (Phtalopal PP) and an acid number of 180–200 are dissolved in ethyleneglycol monomethylether; the solution is applied to a foil of bright rolled aluminum. After the solvent has evaporated, a coating remains which adheres firmly to the surface of the foil. This is then coated with a solution of 5 parts by weight of 1-oxethyl-2,5-bis-(4'-diethylamino-phenyl-(1'))-1,3,4-triazole and 0.3 part by weight of Victoria Pure Blue (Schultz, No. 822) in 60 parts by volume of toluene. The further procedure described in Example 1 is followed and a positive image is obtained on the aluminum surface, if the image obtained by the electrophotographic process, after being powdered over with resin, is fixed by heating to 130–150° C. The foil thus provided with an image can be converted into a printing plate if it is wiped over with a solution consisting of 10 percent diethylamine, 85 percent glycol and 5 percent sodium silicate. After being rinsed down with water, it is inked up with greasy ink.

*Example 6*

4 parts by weight of a resin consisting primarily of colophony and having a melting point of 95–107° C. and an acid number of 210–240 (Laropal S) are dissolved in toluene and the solution is applied to a zinc plate and dried. Then, a solution of 6 parts by weight of anthracene-1-sulfanilide and 0.5 part by weight of Erythrosin (Schultz, No. 886) in carbon tetrachloride is applied to the first coating. Images are produced on this plate by the electrophotographic process and, after the image has been fixed by heating to 200–210° C., the zinc plate is wiped over with a solution consisting of 5 parts by volume of monoethanolamine, 5 parts by volume of diethanolamine, 20 parts by volume of glycerine, 60 parts by volume of glycol and 10 parts by volume of methanol. Those parts of the coating struck by the light are thereby removed from the zinc surface while an image corresponding to the master remains on the metal support. After being rinsed with tap water, the plate is placed in a stone trough fitted with vaned wheels which spray dilute nitric acid (7–8 percent) upon it.

Etching is effected either by the usual multistage process or by the single-stage process. A plate suitable for book printing is obtained.

It will be obvious to those skilled in the art that many modifications may be made within the scope of the present invention without departing from the spirit thereof, and the invention includes all such modifications.

What is claimed is:

1. A process for preparing a printing plate which comprises exposing a charged, metal supported, photoconductive insulating coating, comprising a first layer comprising an alkali-soluble resin and a second layer comprising an organic photoconductor, to light under a master, developing and fixing the resulting image, and removing the non-imaged areas of the coating by treatment with an alkaline liquid.

2. A process according to claim 1 in which the alkaline liquid includes a member selected from the group consisting of water and organic solvents.

3. A process according to claim 1 in which the first layer comprises a styrene interpolymer containing carboxyl groups.

4. A process according to claim 1 in which the first layer comprises a maleinate resin.

5. A process according to claim 1 in which the first layer comprises an oil-free alkyd resin.

6. A process according to claim 1 in which the first layer comprises a mixture of an oil-free alkyd resin and a processed natural resin.

7. A process according to claim 1 in which the first layer comprises colophony.

8. A process according to claim 1 in which the second layer comprises a photoconductive triazole.

9. A process according to claim 1 in which the second layer comprises a photoconductive oxadiazole.

10. A process according to claim 1 in which the second layer comprises a photoconductive pyridone.

11. A process according to claim 1 in which the second layer comprises a photoconductive imidazole.

12. A process according to claim 1 in which the second layer comprises a photoconductive derivative of anthracene.

References Cited by the Examiner
UNITED STATES PATENTS

| | | | |
|---|---|---|---|
| 2,297,691 | 10/1942 | Carlson | 96—1 |
| 2,857,271 | 10/1958 | Sugarman | 96—1 |
| 2,939,787 | 6/1960 | Giaimo | 96—1 |
| 2,940,848 | 6/1960 | Kostelec et al. | |
| 2,957,765 | 10/1960 | Resetich | 96—1 |
| 2,986,467 | 5/1961 | Kostelec et al. | |
| 2,997,387 | 8/1961 | Tanenbaum. | |
| 3,046,124 | 7/1962 | Schmidt | 96—33 |
| 3,104,169 | 9/1963 | Metcalfe et al. | 96—33 |

FOREIGN PATENTS 210,374  9/1957  Australia.

OTHER REFERENCES

Neilson, "Webster's New International Dictionary," 2nd Ed., 1941, Merriam Co., Springfield, Mass., pages 2120–2121 relied on.

NORMAN G. TORCHIN, *Primary Examiner.*

HAROLD N. BURSTEIN, *Examiner.*